United States Patent [19]

Magill

[11] 4,071,206

[45] Jan. 31, 1978

[54] PORTABLE HELICOPTER

[75] Inventor: Gilbert W. Magill, Odessa, Tex.

[73] Assignee: Aerospace General Co., Odessa, Tex.

[21] Appl. No.: 724,528

[22] Filed: Sept. 20, 1976

[51] Int. Cl.$^2$ .................. B64C 27/50; B64C 27/52
[52] U.S. Cl. ................... 244/17.11; 244/4 A; 244/8; 244/83 F; 416/142
[58] Field of Search ............. 244/8, 17.11, 17.13, 244/17.17, 17.25, 17.27, 17.19, 17.21, 83 R, 83 F, 108, 138 A, 141, 4 A; 416/142, 21; 180/33 R, 90; D12/110, 178, 175, 177

[56] References Cited

U.S. PATENT DOCUMENTS

| D. 180,311 | 5/1951 | Ziegler | D12/73 |
|---|---|---|---|
| 2,601,463 | 6/1952 | Stanley | 416/21 |
| 2,745,498 | 5/1956 | Nagler | 244/17.11 |
| 2,763,447 | 9/1956 | Carrau | 416/21 |
| 2,905,410 | 9/1959 | Bensen | 244/108 |
| 3,029,047 | 4/1962 | Jacobsen et al. | 244/17.11 |
| 3,042,347 | 7/1962 | Halsey | 244/141 |
| 3,220,670 | 11/1965 | Fuller | 244/17.17 |
| 3,586,263 | 6/1971 | Payne | 244/17.17 |
| 3,750,982 | 8/1973 | Gear | 416/142 |

FOREIGN PATENT DOCUMENTS

| 524,799 | 9/1921 | France | 244/108 |
|---|---|---|---|
| 686,608 | 1/1953 | United Kingdom | 244/17.11 |

OTHER PUBLICATIONS

"Cafe Racer's Choice", *Cycle World*, p. 23, July 1974.

"1948 Rotary Wing Pictoral Review", *American Helicopter* pp. 10-18, Dec. 1948.

*Primary Examiner*—Galen L. Barefoot
*Attorney, Agent, or Firm*—Clarence A. O'Brien; Harvey B. Jacobson

[57] ABSTRACT

A basic lightweight helicopter frame is strapped to the body of a pilot and includes vertical side bars interconnected above the pilot's head to rotatably support a bladed rotor assembly and carry a rearwardly extending tail rotor assembly. The lower ends of the side bars carry fuel tanks from which rocket engines at the tips of the rotor blades draw fuel. A control assembly is supported at the upper end of the frame and extends forwardly therefrom for easy access by the pilot. The aircraft includes an attachable landing gear and an attachable pusher blade and engine assembly which can be used when desired.

12 Claims, 11 Drawing Figures

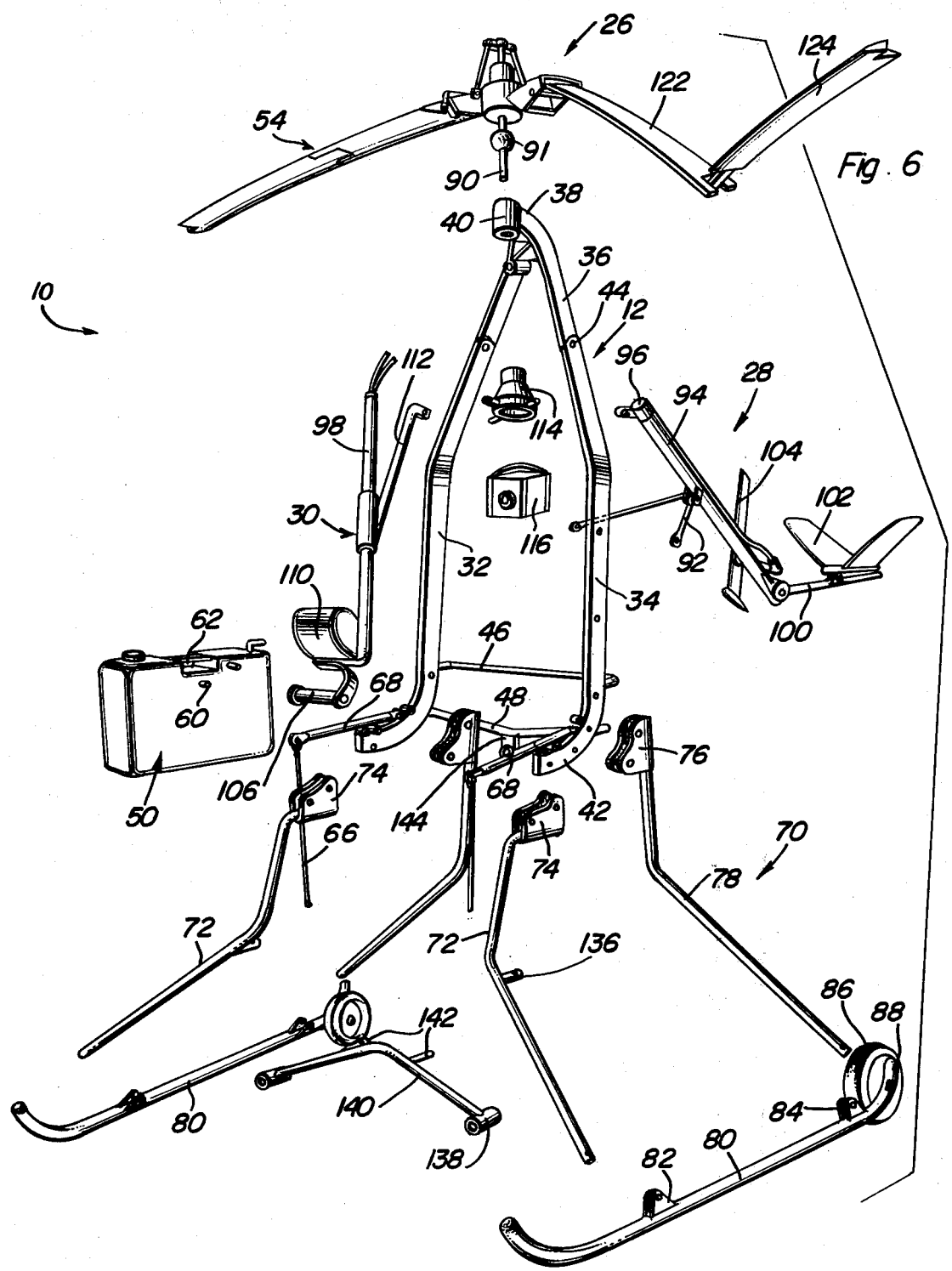

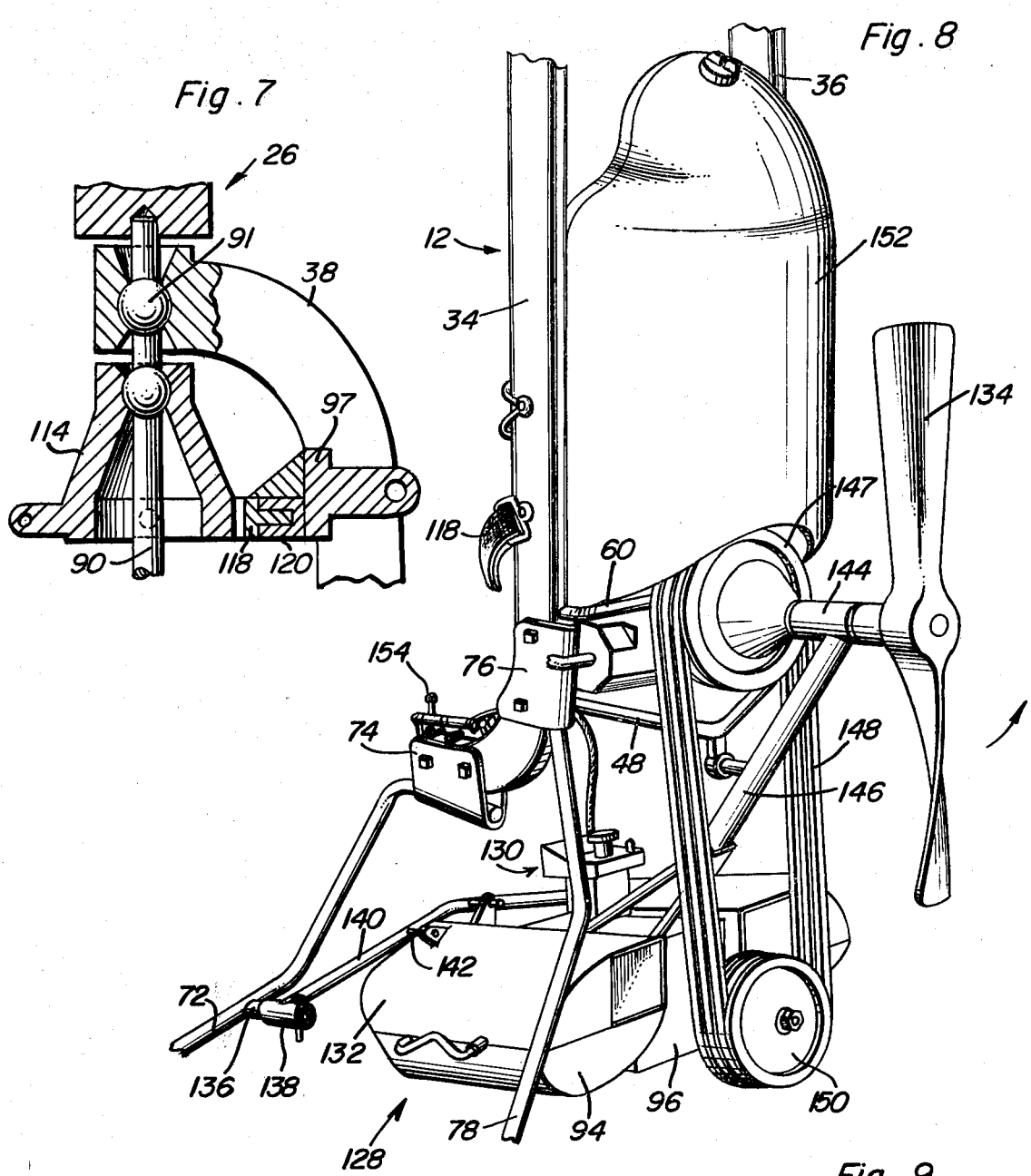

PORTABLE HELICOPTER

This invention relates to rotary-winged aircraft and in particular to such aircraft that may be made portable and of extremely simple construction.

There is need for rotary-wing aircraft that is of relatively economical construction, and capable of being rapidly assembled, disassembled and compactly stored for transport purposes. The construction of aircraft meeting the foregoing requirements has not been heretofore accomplished with much success. It is therefore an important object of the present invention to provide an aircraft of the rotary-winged type that is devoid of the usually heavy and/or costly equipment and is yet effective as well as versatile in operation and use.

In accordance with the present invention, a generally "A" shaped frame assembly is strapped to the body of a pilot. The frame is formed by side bars interconnected at the upper ends with a bearing collar for rotatably supporting a bladed rotor assembly above the pilot's head. The rotor blades are driven by tip mounted rockets to which fuel may be fed from fuel tanks carried at the lower ends of the side bars on opposite sides of the pilot. A rotor type tail assembly is connected to the upper end of the frame and extends rearwardly therefrom while a control assembly extends downwardly and forwardly from the upper end of the frame. A landing gear assembly may be optionally attached to the basic frame together with a seat web and footrest for the pilot. Also, a detachable thrust producing unit may be added to the frame to enlarge the operational capabilities of the basic aircraft configuration which is otherwise capable of being disassembled, folded and stored in compact form within a portable carrying case.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 6 is a perspective view of a disassembled aircraft showing some of its essential parts.

FIG. 7 is a partial sectional view taken substantially through a plane indicated by section line 7—7 in FIG. 5 showing the mounting for the rotor shaft.

FIG. 8 is a rear perspective view of a portion of the aircraft shown in FIG. 5 showing the pusher assembly.

FIG. 9 is an enlarged perspective view of a detailed portion of the aircraft showing the tank mounting.

Figure 1:
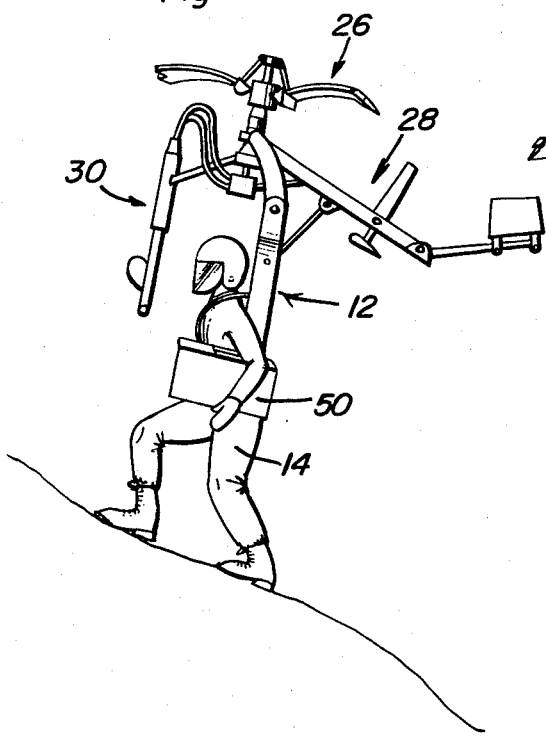
FIG. 1 is a simplified perspective view of the aircraft in a first operational mode in which the pilot's feet serve as a landing gear.

Referring now to the drawings in detail, the helicopter is generally denoted by reference numeral 10 and includes a frame assembly generally referred to by reference numeral 12 adapted to be strapped to a pilot 14 by means of shoulder harness 16, transverse rear body belt 18 and seat belt 20, lower crotch strap 22 and a web type seat 24. The harness, belts, strap and web seat are all anchored to the frame assembly which supports on top thereof, a bladed main rotor assembly 26, a tail assembly 28, and a control assembly 30.

Figure 5:
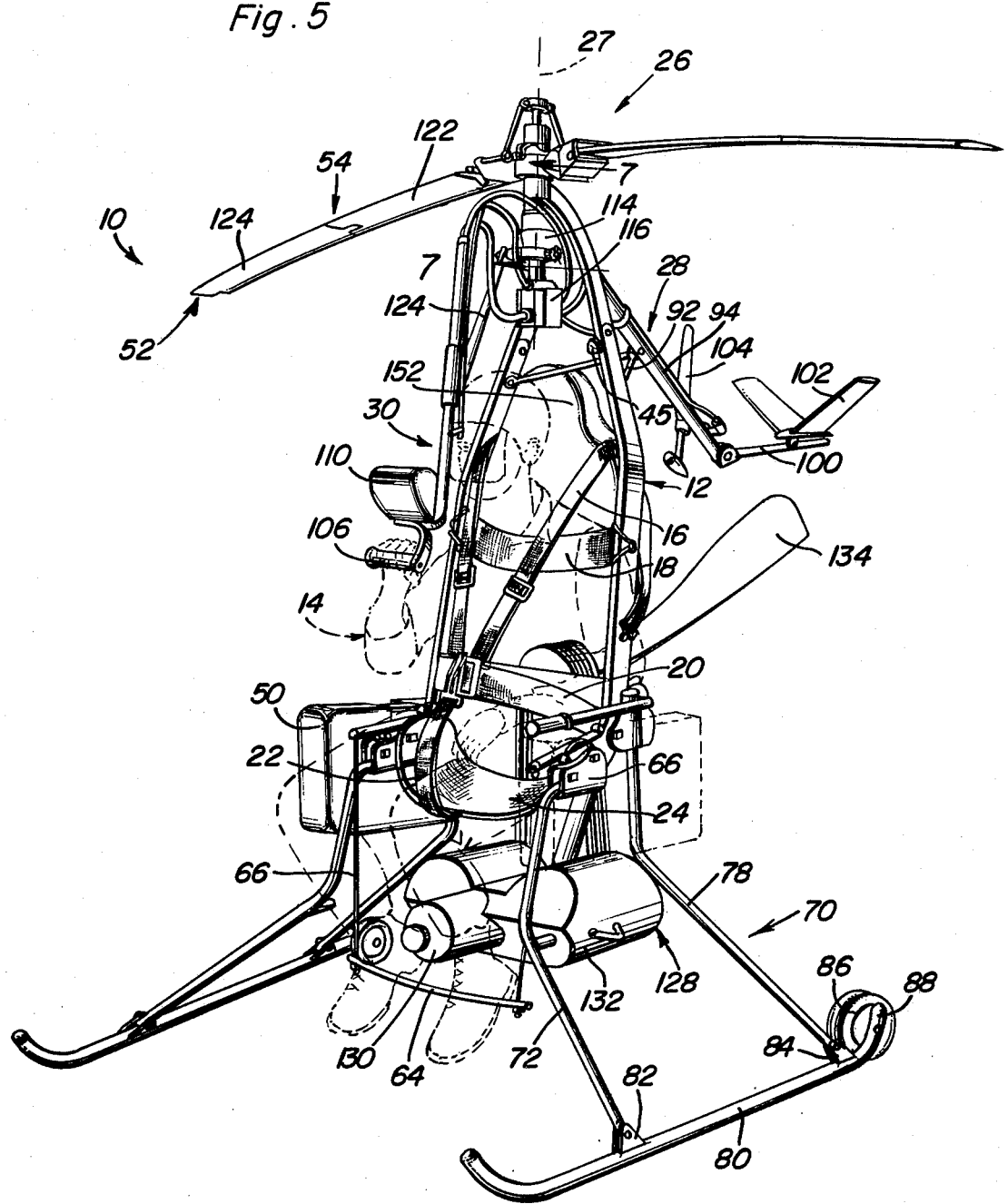
FIG. 5 is a perspective view of an aircraft constructed in accordance with the present invention in a thrid operational mode, with certain parts omitted or shown in dotted line, in which a pusher propeller and engine assembly have been added.

As more clearly seen in FIGS. 5 and 6, the frame assembly 12 is an A-shaped configuration consisting of a pair of side bars 32 and 34 with upper converging sections 36 which are interconnected at a vertex portion 38 to which a bearing collar 40 is connected. The bearing collar rotatably supports the bladed main rotor assembly 26 which is rotatable about a vertical lift axis 27 disposed forwardly of the side bars 32 and 34. The side bars have curved lower end portions 42 which extend forwardly of the vertical lift axis. Upper sections 36 are pivotally connected to side bars by means of adjustable pivots 44 which can be adjusted by knob 45 to adjust lift axis 27 fore-and-aft for individual trim of the aircraft. Angular adjustment of the upper sections 36 relative to the side bars pivots the bearing collar 40 and the vertical rotor axis fore-and-aft for longitudinal trim of the aircraft. The side bars are interconnected adjacent the lower end portions 42 by a rear brace rod member 46 and an engine support member 48.

The pilot's seat 24 is attached to the lower end portions 42 of the frame assembly between fuel tanks 50. The fuel tanks are readily detachable for packing and remote refilling and are arranged in balanced relation on opposite sides of the vertical lift axis extending both forwardly and rearwardly thereof. A fuel quantity gauge (not shown) would normally be used in the forward top portion of each tank. Rocket motors 52 mounted at the outer ends of the rotor blades 54 utilize fuel such as hydrogen peroxide simultaneously drawn from the rocket fuel tanks 50 which are attached to the lower end portions 42 of the side bars. As more clearly seen in FIG. 9, the upper edges of the lower end portions 42 are provided with sleeves 56 and 58 by means of which the rocket fuel tanks 50 are attached. Quick disconnect pins 60 extend from the fuel tanks in alignment with the sleeves 56 and 58 for this purpose below and to one side of the carrying handle formation 62. Thus, the fuel tanks are supported in a balanced condition on opposite lateral sides of the vertical lift axis and extend both forwardly and rearwardly thereof. In this fashion, the aircraft remains in balance as the fuel supply is depleted.

As shown in FIG. 5, the pilot strapped to the frame assembly and supported on the seat web 24 which extends between the fuel tanks, will be aligned with the vertical lift axis below the rotor. In this manner, the aircraft remains in balance regardless of the weight variation of different pilots. The pilot's feet may be supported on a footrest bar 64 suspended by cables 66 from the forward ends of support rods 68 extending forwardly of the lower end portions 42 of the side bars as more clearly seen in FIGS. 2 and 5.

Figure 3:
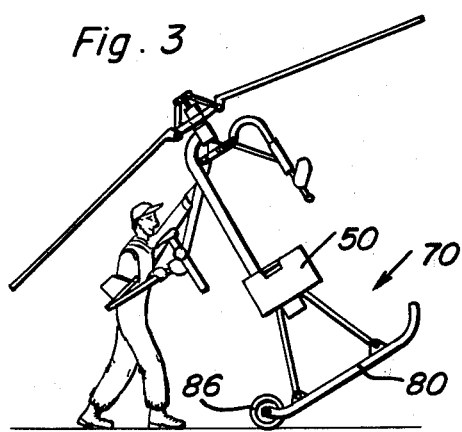
FIG. 3 is a simplified side elevation view of the aircraft shown in FIG. 2, being taxied or tilted and pushed to a desired location.

Attached to the frame assembly 12, as shown in FIG. 5, is a landing gear generally referred to by reference numeral 70, supporting the frame assembly in spaced relation above the ground a distance preferably less than the length of the pilot's legs when fully extended downwardly. It should be appreciated that attachment of the landing gear is optional since the aircraft may operate without it when the pilot's feet are utilized as the undercarriage as shown in FIG. 1. The ability of the pilot to utilize his feet for landings without the landing gear is advantageous where rough and irregular terrain is involved since landing may be effected at any location where the pilot is able to stand. On sloping terrain, the ability of the pilot to support the craft on his feet will enable him to maintain a vertical attitude of the helicopter for take-off and landing. Even with the landing gear attached, the pilot's feet may be extended below the skids during take-off or landing. When the landing gear is to be utilized, it is attached to the frame assembly at the lower end portions 42 of the side bars. The landing gear, as more clearly seen in FIG. 6, consists of a pair of front legs 72 connected to the forward ends of the lower end portions 42 by clamps 74. A second pair of clamps 76 are utilized to attach rear legs 78 to the lower end portions 42 rearwardly of the clamps 74. The front and rear legs extend downwardly and diverge laterally for attachment to a pair of skid members 80 adapted to support the frame assembly 12 in spaced relation above the ground. Each skid member is accordingly provided with attachment ears 82 and 84 to which the lower ends of the legs 72 and 78 are attached. All connections between the skids, legs and frame are made with quick disconnect pins. The skid members 80 extend substantially perpendicular to the vertical lift axis for proper support of the aircraft on the ground. In this position, as shown in FIG. 5, taxi wheels 86 are held out of engagement with the ground by the rear ends 88 of the skid members. It will be apparent therefore, that in order to move the craft along the ground, the frame may be tilted backwardly bringing the taxi wheels 86 into engagement with the ground for wheeled support of the aircraft as shown in FIG. 3. Movement of the craft along the ground is thereby facilitated. Take-offs may also be made from a seated position with the helicopter fuel tank bottoms resting on the ground.

The tail assembly 28 as shown in FIG. 6 is connected to the frame assembly 12 by means of a pair of downwardly diverging links 92 adapted to be pivotally connected to the side bars 32 and 34. The links are connected to a front tail boom 94 intermediate the opposite ends thereof, by a removable quick-disconnect pin. The forward end 96 of the tail boom is pivotally connected to a support bracket 97 located to the rear of the bearing collar 40 adjacent to the main rotor axis. Accordingly, the tail boom 94 extends downwardly and rearwardly from the frame assembly and mounts at its lower end, a rear tail boom 100 and stabilizer 102. Also, a tail rotor 104 is rotatably mounted on the tail boom 94 adjacent its lower end. The tail rotor pitch is adjustable as well as the pitch of the main rotor blades 54.

The control system is of any conventional type including those which tilt the rotor tip-path plane by tilting the rotor axis, utilize cyclic pitch change of the rotor blades, vary the collective pitch of the rotor blades and the rotor driving power, and those which vary the directional heading and counteract any rotor torque applied to the frame assembly. In this manner, the motion of the aircraft about all three axes is maintained, and it is possible to move the aircraft in any direction.

Figure 10:
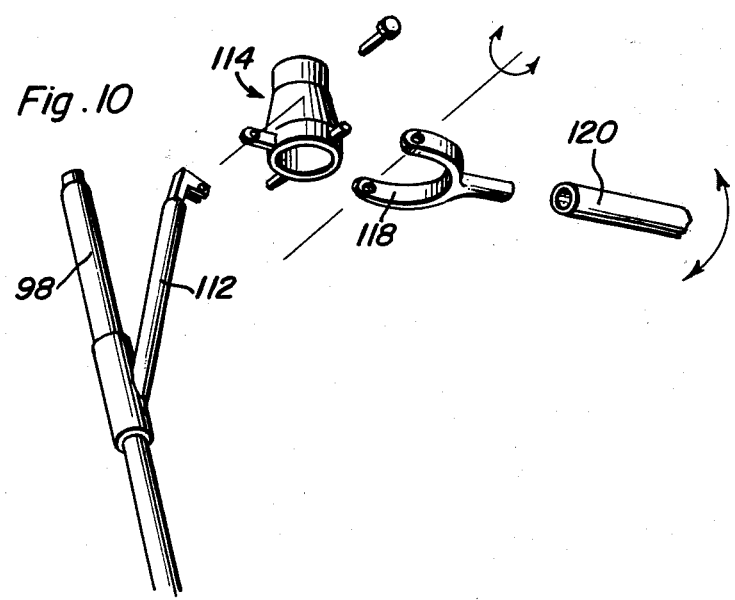
FIG. 10 is a perspective view of certain disassembled parts of the control apparatus.

The main rotor control assembly 30 shown by way of example in FIGS. 7 and 10 utilizes a tiltable rotor shaft 90 which may pivot about a ball 91 retained in bearing collar 40. A control stick 98 extends vertically downwardly and forwardly of the frame assembly 12 so as to position its control handle 106 and instrument assembly 110 at a comfortable height for the aircraft pilot as shown in FIG. 5. The instruments normally used are a main rotor tachometer and an air speed indicator. A connecting bar 112 interconnects the control stick 98 with a control cone 114 through which the rotor shaft 90 extends into a gear box 116 which drives the rubber rear rotor 104 through a suitable flexible drive shaft. The control cone 114 is rotatably supported about a lateral axis by yoke 118 as more clearly seen in FIG. 10. The yoke 118 in turn is supported for angular adjustment about a longitudinal axis by a tubular socket 120 as more clearly seen in FIG. 10. Pushing the control handle 106 forward tilts the control cone 114 backward about the lateral axis. The top of control cone 114 pushes the bottom of rotor shaft 90 rearward, tilting the shaft forward by pivoting about ball 91, which in turn tilts the rotor plane forward so as to drive the helicopter forward. Pushing the handle to the left about the longitudinal axis similarly tilts the rotor shaft 90 to the left causing the helicopter to drift to the left.

From FIG. 6, it will be apparent that the main rotor blades 54 and the tail assembly 28 are readily foldable adjacent to the rotor axis and foldable again at their mid-portions. Also, it will be observed that the blades 54 associated with the rotor assembly have pivoted inner sections 122 and pivoted outer sections 124. The upper rearward end of connecting bar 112 attaches to the lower forward portion of cone 114 by means of quick disconnect pin. A pivot pin and latch could be substituted to fold the control handle back out of the way when not in use. Thus, all of the components may be readily stored in compact form.

Figure 4:
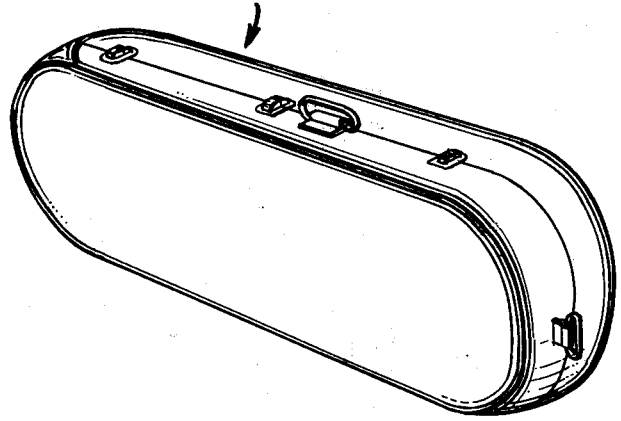
FIG. 4 is a perspective view of the carrying case used to house the folded aircraft to facilitate it being carried.
Figure 11:
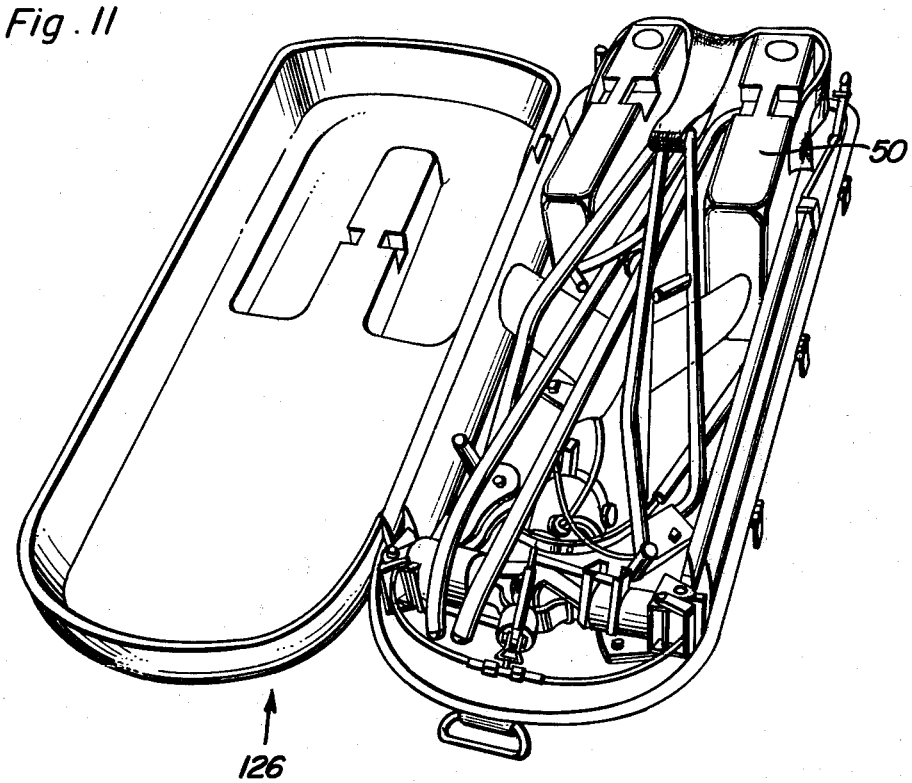
FIG. 11 is a perspective view showing a disassembled and folded aircraft arranged in compact form within the opened carrying case.

As shown in FIG. 11, the parts of the aircraft when folded and disassembled, may be fitted into a carrying case 126 which may be closed as shown in FIG. 4, and carried by hand. The case also encloses the pair of fuel tanks 50 aforementioned. The case may be of any convenient size and shape that will enclose the components. The one shown in FIG. 4 resembles a suitcase with rounded ends. It is shown hinged along one side. It is preferably made of strong lightweight materials, such as aluminum or fiberglass and may contain interior foam pads (not shown) to hold in position the components of the aircraft and insulate them from shock and sudden temperature changes. The case, with the helicopter enclosed, may be carried aboard an aircraft and dropped by parachute to rescue a downed pilot, or the helicopter could be packed into other cases currently used to paradrop military supplies. Thus, a complete operative aircraft may be readily transported to any desired location and assembled quickly.

The forward thrust producing unit may, of course, be separately folded and packed in a similar case and transported with the aircraft if it is to be utilized, or all items could be carried together in a single larger case.

As shown in FIG. 5 by way of example, a forward thrust unit 128 is supported below the seat 24 in such a manner that its center of gravity is aligned with the vertical lift axis so as not to disturb the longitudinal trim of the aircraft when the unit is attached. A lighter weight unit such as a rocket or gas turbine could be attached to the frame assembly behind the pilot without substantially disturbing the longitudinal trim of the aircraft. In this case, it would be located high enough to preferably exert its forward thrust nearly in alignment with the vertical center of gravity of the aircraft.

In the embodiment illustrated in FIGS. 5 and 8, the thrust unit 128 includes an internal combustion engine 130 having colling shrouds 132, which may be located at any convenient place such as behind the pilot. The engine drives a rearwardly disposed pusher type propeller 134. Where the engine is located below the pilot, it is preferable to use a landing gear. The front legs 72 of the landing gear are provided with rearwardly extending pins 136 adapted to be received within the sleeves 138 attached to opposite ends of a front suspension bar 140 which is provided with two suspension pegs 142. The suspension pegs 142 together with the rear bar 48, are utilized to support the forward thrust producing unit 128 as more clearly seen in FIG. 8. FIG. 8 also shows a horizontal bearing sleeve 144 connected to the upper end of the support bar 146 for journaling a propeller shaft to which the pusher type propeller 134 is connected. The forward end of the propeller shaft is connected to a pulley wheel 147 drivingly connected by the endless belt assembly 148 to the drive pulley 150 driven by the engine and located below the frame 12. When utilizing the pusher propeller type forward thrust unit 128, a gasoline tank 152 is added behind backrest strap 18. The tank is connected to the side bars 34 and 36 and extends rearwardly therefrom in front of the pusher propeller in protective relation to the pilot. When it is desired to make flights of longer range than is permitted by the gasoline contained in the back tank, then the gasoline may be stored in side tanks of larger capacity, and a peroxide tank for the rocket fuel may be located in a tank behind the pilot, or in some other convenient location.

With the landing gear attached, the forward thrust producing unit 128 is mounted as hereinbefore described so that its center of gravity will be substantially aligned with the vertical lift axis below the frame 12 in order to avoid disturbance of the aircraft longitudinal and lateral balance. One of the support rods 68 as more clearly seen in FIG. 9 may mount a throttle control 154 as shown in FIG. 8 by means of which a flexible cable operated carburetor valve (not shown) may regulate or control the flow of gasoline to the forward thrust producing unit.

Figure 2:
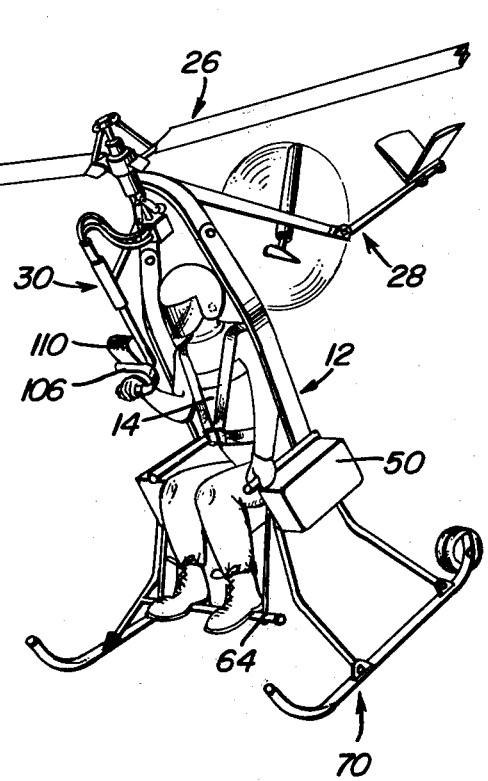
FIG. 2 is a simplified perspective view of the aircraft in a second operational mode in which a landing gear and seat assembly is used.

Depending on the requirements of the mission to be performed, the aircraft may be varied in the peripheral components assembled therein. In its most elemental configuration shown in FIG. 1, only the basic and essential components are included consisting of the frame assembly 12, the rotor assembly 26, the tail assembly 28, the control assembly 30 and the fuel tanks 50. The frame assembly will include the pilot body straps 16, 18, 20 and 22. The helicopter aircraft in this operational configuration may be simply strapped to the pilot's body while the pilot's legs serve as the landing gear. When disassembled and folded, this configuration of the aircraft can be entirely stored in the carrying case 126 as shown in FIGS. 4 and 11.

Where human feet are not suitable for landing purposes, the landing gear assembly 70 is added to the frame assembly 12 as well as the seat web 24 and footrest 64 as shown in FIG. 2. This configuration of the aircraft may be manually taxied as shown in FIG. 3 and remains extremely light weight and simple. This is made feasible by use of rotor blade tip mounted rockets 52.

The power output of the rockets may be throttled by an adjustable valve (not shown) controlled by the pilot through the control assembly 30.

By adding the detachable thrust producing unit 128 as shown in FIGS. 5 and 8, rocket power for rotor drive may be stopped after the aircraft has attained autogyro flight conditions under the forward thrust of unit 128. The tail rotor in the tail assembly 28 may then provide directional control by simply changing the blade pitch of the tail rotor blade 104. Of course, rocket power may be used simultaneously with the forward thrust of unit 128 to increase forward speed, rate of climb or load carrying capacity.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a rotary wing aircraft, a substantially "A"-shaped frame having an upper vertex portion and a pair of downwardly diverging side bars, one each of which side bars is pivotally mounted to one of the free ends of the upper vertex portion, means for adjusting the upper vertex portion of the frame and the side bars to control the position of a vertical lift axis spaced forwardly of and laterally between said side bars, harness means for attaching the frame to at least one pilot of the aircraft, the vertical lift axis being adjustable to the individual trim of the pilot by means of the adjusting means, rotor means mounted by the frame and having rotor blades, rocket means mounted on said blades for powered rotation thereof about the vertical lift axis, tail boom means connected to the frame, and means for controlling the aircraft.

2. The apparatus of claim 1 wherein the tail boom means comprise:
    an elongated boom pivotally connected at its inner end to the upper vertex portion of the frame, the boom extending downwardly and rearwardly of the frame;
    stabilizer means mounted on the outer end of the boom; and;
    tail rotor means pivotally mounted on the boom between the inner end and the outer end of said boom.

3. The apparatus of claim 2 and further comprising:
    a pair of links pivotally connected to the boom medially of its length, each of the links extending from said boom downwardly to pivotally connect with one each of the side bars of the frame.

4. The apparatus of claim 2 wherein the tail rotor means comprises a variable pitch rotor.

5. The apparatus of claim 2 and further comprising:
    means for controlling the angular relation of the boom to the frame.

6. The apparatus of claim 5 wherein the last-mentioned means comprise:
    a control stick pivotally mounted to the frame and extending forwardly thereof;
    means pivotally mounting said control stick to the frame, said means pivotally mounting the inner end of the tail boom to the frame; and,
    instrument means located on the outer end of the control stick, the outer end of the control stick being disposed in oppositely facing relation to the face of the pilot.

7. The apparatus of claim 1 and further comprising: forward thrust means mounted to the frame on the rear thereof.

8. The apparatus of claim 7 wherein the forward thrust means comprise:
prime mover means disposed under the pilot, the center of gravity of the prime mover means beging substantially disposed on the vertical lift axis;
rotor blade means rotatably mounted to the frame on the rear thereof and vertically spaced from the prime mover means for propelling the aircraft in a forward direction substantially perpendicular to said vertical lift axis; and,
means for driving the rotor blade means from the output of the prime mover means.

9. The apparatus of claim 1 and further comprising:
a pair of skids connected to the frame, the skids having forward and rear ends, the rear end of each of the skids being angularly turned upwardly from main body portions of said skids; and,
a wheel mounted for rotation at the outer end of the rear end of each of the skids, said wheels being raised off the ground when the skids are flat on the ground, the aircraft being rollably supported by the wheels when the aircraft is tilted rearwardly.

10. The apparatus of claim 1 and further comprising landing gear means detachably connected to the frame.

11. The apparatus of claim 1 wherein the rotor blades are foldable adjacent to the vertical lift axis and medially of the length of each of the rotor blades.

12. The apparatus of claim 1 wherein the side bars of the frame have lower end portions extending forwardly of each of said side bars and forwardly of the vertical lift axis, the apparatus further comprising:
a pair of fuel tanks detachably mounted one each on said lower end portion of the side bars, said fuel tanks each extending forwardly and rearwardly of the vertical lift axis.

* * * * *

Disclaimer

4,071,206.—*Gilbert W. Magill*, Odessa, Tex. PORTABLE HELICOPTER. Patent dated Jan. 31, 1978. Disclaimer filed Sept. 23, 1980, by the assignee, *Aerospace General Company*.

Hereby enters this disclaimer to the entire term of said patent.

[*Official Gazette November 25, 1980.*]